United States Patent [19]

Winston Adolph A.

[11] Patent Number: 4,497,835

[45] Date of Patent: Feb. 5, 1985

[54] ARTIFICIALLY SWEETENED BEVERAGE MIXES AND PROCESS THEREFOR

[75] Inventor: Winston Adolph A., Fayetteville, N.Y.

[73] Assignee: Alberta Gas Chemicals, Incorporated, Parsippany, N.J.

[21] Appl. No.: 456,986

[22] Filed: Jan. 10, 1983

[51] Int. Cl.³ .................. A23L 2/00; A23L 1/30; A23L 1/27; A23L 1/236

[52] U.S. Cl. ............................. 426/72; 426/73; 426/96; 426/250; 426/285; 426/548; 426/590; 426/597; 426/453; 426/804

[58] Field of Search ........... 426/590, 591, 548, 804, 426/250, 72, 73, 96, 285, 453, 597

[56] References Cited

U.S. PATENT DOCUMENTS

| | | | |
|---|---|---|---|
| 3,397,063 | 8/1968 | Carlson et al. | 426/96 |
| 3,433,644 | 3/1969 | Ganske et al. | 426/590 |
| 3,615,672 | 10/1971 | Pischke | 426/590 |
| 3,642,491 | 2/1972 | Schlatter | 426/590 |
| 3,761,288 | 9/1973 | Glicksman et al. | 426/548 |
| 3,968,263 | 7/1976 | Reussner | 426/590 |
| 4,051,268 | 9/1977 | Shires et al. | 426/548 |

FOREIGN PATENT DOCUMENTS

| | | | |
|---|---|---|---|
| 2103917 | 3/1983 | United Kingdom | 426/590 |
| 2104369 | 3/1983 | United Kingdom | 426/590 |

Primary Examiner—Raymond Jones
Assistant Examiner—Elizabeth C. Weimar
Attorney, Agent, or Firm—Charles E. Baxley

[57] ABSTRACT

A novel formulation and method of processing for artificially sweetened, sugar free, powdered beverage mixes containing Aspartame (an artificial sweetener) is obtained by premixing the ingredients until the blend is uniform in composition, feeding the blend through an agglomerator such that the faster dissolving ingredients form two layers around each particle of Aspartame, and drying and cooling the agglomerated particles to provide a free flowing blend.

23 Claims, No Drawings

ARTIFICIALLY SWEETENED BEVERAGE MIXES AND PROCESS THEREFOR

BACKGROUND

This invention relates to sugar free low calorie powdered beverage mixes artificially sweetened with the dipeptide, "Aspartame".

Aspartame (L-asparatyl—L-phenylalanine) is a white crystalline powder having a sweetness lever in powdered beverage mixes of 180 times that of sucrose. Its taste is very nearly identical with sucrose and unlike saccharin, there is no bitter aftertaste. However there are problems with its use in powdered beverage mixes. Aspartame is exceedingly slow to dissolve in cold water as compared with sucrose. When mixes in which Aspartame is simply blended are reconstituted in cold water, the dipeptide tends to form a white floating and unpleasant looking scum on the surface of the drink.

DESCRIPTION OF THE INVENTION

A novel formulation and method of processing for artificially sweetened, sugar free powdered beverage mixes containing "Aspartame" has been found which reconstitute in cold water as rapidly as their sugar containing counterparts and which do not leave a floating white scum on the surface of the drink. These improved compositions contain all the ingredients except the sugar of their sugar containing counterparts plus the "Aspartame" and plus hydrolized cereal solids such as dextrins. The improvement in the rate of solution of the powdered beverage mix is obtained by a novel process whereby all ingredients other than the color are premixed until all ingredients are uniformly distributed. The color dissolved in water is then sprayed into the mixer as the ingredients are being blended. Just enough water is added so as to eliminate the need for subsequent drying and still have a free flowing stable powder. A uniformly colored, uniform in composition and quick dissolving powdered drink mix is obtained which on reconstitution does not leave a floating scum and which is equivalent to its sugar containing counterpart in sweetness and overall consumer acceptance. This unique result is accomplished because each granulate of the dipeptide becomes coated with a layer consisting of all the fast dissolving water soluble ingredients in the beverage mix. These ingredients are present at a level of at least 10 parts by weight to one part by weight of Aspartame.

The following examples provide specific details of the formulas and processes of the present invention.

EXAMPLE I

Orange Flavored Breakfast Drink Mix (Sugar Free)

In a Sprout Waldron ribbon mixer of 2.5 cubic feet (100 lbs) capacity with ribbons rotating at 75 rpm add:
  Malic acid: 34.5 lbs
  Maltrin 10: 14.7 lbs
  Cloud: 14.3 lbs
  Natural and Artificial Flavors: 11.3 lbs
  Sodium Citrate: 6.8 lbs
  Tricalcium Phosphate: 5.8 lbs
  Aspartame: 4.5 lbs
  Vitamin C: 3.7 lbs
  Cellulose Gum: 0.75 lbs
  Vitamin A: 0.21 lbs.
  Blend five (5) minutes.

Dissolve 50 grams of Yellow No. 6 and 25 grams of Yellow No. 5 in 750 ml of water.

While running the mixer, slowly spray the color solution into the mix at a rate of 150 ml per minute.

After all the color solution is added, continue mixing for another ten minutes.

Mix 20 grams of the mix with enough cold water and ice to make 2 liters of a finished orange flavored breakfast drink.

EXAMPLE II

Presweetened Lemon Flavored Iced Tea Mix (Sugar Free)

In a mixer as identified in Example I add:
  Maltrin 10: 47.5 lbs
  Instant Tea: 22.3 lbs
  Malic Acid: 18.6 lbs
  Aspartame: 4.6 lbs
  Dehydrated Lemon Juice: 5.7 lbs.
  Blend five (5) minutes.

Dissolve 558 grams of caramel color in 750 ml of water. While running the mixer, slowly spray the color solution into the mix at a rate of 150 ml per minute. Continue mixing for an additional 10 minutes.

Mix 20 grams of the mix with enough cold water and ice to make 2 liters of a sugar free lemon flavored iced tea drink.

EXAMPLE III

Presweetened Sugar Free Lemonade Drink Mix

In a mixer as identified in Example I add:
  Malic Acid: 39.8 lbs
  Maltrin 10: 39.1 lbs
  Dehydrated Lemon Juice: 11.9 lbs
  Cloud: 4.2 lbs
  Aspartame: 4.0 lbs
  Ascorbic Acid: 0.57 lbs
  Tricalcium Phosphate: 0.30 lbs
  Lemon Oil: 0.03 lbs.
  Blend five (5) minutes.

Dissolve 6.5 grams of Yellow #5 in 750 ml of water.

Spray the color solution on to the mix while running the mixer at a rate of 150 ml per minute.

Continue mixing for an additional 10 minutes.

Mix 20 grams of the mix with enough cold water to make 2 liters of sugar free lemonade.

EXAMPLE IV

Presweetened Imitation Orangeade Drink Mix (Sugar Free)

In a mixer as identified in Example I add:
  Maltrin 10: 45.5 lbs
  Malic Acid: 38.4 lbs
  Natural and Artificial Flavors: 8.8 lbs
  Aspartame: 5.0 lbs
  Cloud: 1.2 lbs
  Ascorbic Acid: 0.8 lbs.
  Blend five (5) minutes.

Dissolve 84 grams of yellow #6 and 37 grams of Yellow #5 in 750 ml of water and spray into the mix as described in previous examples.

Dissolve 20 grams of the mix with enough cold water and ice to make 2 liters of orangeade drink.

EXAMPLE V

Presweetened Imitation Grape Drink Mix (Sugar Free)

In a mixer as described in Example I add:
Maltrin 10: 68.3 lbs
Malic Acid: 22.4 lbs
Aspartame: 5.0 lbs
Artificial Flavor: 3.1 lbs
Ascorbic Acid: 0.8 lbs.
Blend five (5) minutes.

Dissolve 175 grams of Red #40 and 43 grams of Blue #1 in 750 ml of water and spray into the mix as described in previous examples.

Dissolve 20 grams of the mix with enough cold water and ice to make 2 liters of grape drink.

Additional fruit flavors of presweetened sugar free drink mixes such as Cherry, Fruit Punch, Raspberry, and Strawberry can be made in a manner similar to Example V.

An alternate procedure for providing a fast dissolving Aspartame containing drink mix consists of the following sequence of operations:

(1) Into a ribbon or any suitable mixer add the ingredients in the following sequence while mixing:
   Maltrin
   Food acid
   Aspartame
   All others including artificial colors (2) Feed the mixture to any suitable agglomerator such as manufactured by Blaw Know, Niro, Cherry Burrel, etc. These devices spray live steam or very hot water on to the mix while the mix is in a highly agitated state so as to uniformly wet the fast dissolving water soluble ingredients and thus forms a coating about the slow dissolving Aspartame. The amount of water added should be as little as possible but should not exceed 3%. Subsequently, the particles are heated with hot air to remove excess moisture and cooled with ambient air to room temperature. The resulting mix will be uniform in composition and will dissolve in cold water as rapidly as its sugar containing counterpart.

I claim:

1. A method of manufacturing pre-sweetned, sugar-free powdered beverages which contain a mix which comprises hydrolyzed cereal solids, a food acid selected from the group consisting of citric, malic and fumaric acids, and mixtures thereof, a flavor, a clouding agent, aspartame, and a color, wherein the ratio of the combined weight of the natural cereal solids and the food acids to the weight of aspartame, is from about 10:1 to about 20:1, comprising the steps:
   (a) preblending all of the ingredients, except the color, of the mix to provide a uniform blend of the ingredients free of balls of aspartame,
   (b) dissolving the color in a quantity of water ranging from about 0.5 to about 2% of the weight of the mix of ingredients, and
   (c) spraying the color solution into the blend while continuing mixing so as to partially dissolve the hydrolyzed cereal solids and food acids which preferentially absorb the color solution, and form a coating around the aspartame particles.

2. Presweetened, sugar-free, powdered drink mix consisting of hydrolyzed cereal solids, malic acid, aspartame, a clouding agent, a flavor and a color, processed as described in claim 1.

3. A process according to claim 1 wherein the mix further contains vitamin C.

4. A process according to claim 3 wherein the mix further contains vitamin A.

5. A process according to claim 4 wherein the mix further tricalcium phosphate.

6. A process according to claim 5 wherein the mix further contains cellulose gum.

7. A process according to claim 6 wherein the flavor is lemon flavor or orange flavor.

8. A process according to claim 6 wherein the flavor is instant tea.

9. A powdered, sugar-free, presweetened instant tea mix processed by the method described in claim 8.

10. A powdered sugar free, pre-sweetened beverage mix prepared according to the process claim 8 which also contains dehydrated lemon juice powder as a flavor.

11. A powdered sugar-free, pre-sweetened beverage mix prepared according to the process of claim 8, wherein the food acid is malic acid.

12. A process according to claim 7 wherein the food acid is malic acid and the flavor is orange flavor.

13. A process according to claim 4 wherein the mix further contains carrageenan.

14. A process according to claim 13 wherein the food acid is malic acid.

15. A pre-sweetened, sugar-free, powdered drink mix prepared according to claim 1 wherein the hydrolyzed cereal solids are present in an amount ranging from 12 to 70% by weight.

16. A pre-sweetened, sugar-free, powdered drink mix according to claim 15 wherein the food acids are present in an amount ranging from 15 to 40% by weight.

17. A pre-sweetened, sugar-free, powdered drink mix according to claim 16 wherein aspartame is present in an amount ranging from 4 to 5% by weight.

18. A process according to claim 7 wherein the flavor is lemon flavor.

19. A process according to claim 7 wherein the flavor is orange flavor.

20. A lemon flavored, pre-sweetened, sugar-free, powdered drink mix prepared by the process of claim 18.

21. An orange flavored, pre-sweetened, sugar-free, powdered drink mix prepared by the process of claim 19.

22. A method of manufacturing pre-sweetened, sugar-free powdered beverages which contains a mix which comprises hydrolyzed cereal solids, a food acid selected from the group consisting of citric, malic, and fumaric acids and mixtures thereof, a flavor, a clouding agent, vitamin C, aspartame, and a color, wherein the ratio of the combined weight of the natural cereal solids and the food acids to the weight of aspartame, is between from about 10:1 to about 20:1, comprising the steps:
   (a) preblending all of the ingredients in the mix until the blend is uniform and free of balls of aspartame,
   (b) feeding the blend through an agglomerator wherein the particles are uniformly wetted by spraying with live steam whereby the hydrolyzed cereal solids and food acids, which preferentially absorb the moisture, are partially dissolved and form a layer around each particle of aspartame, and
   (c) drying and cooling the agglomerated particles to provide a free flowing blend.

23. Powdered, sugar-free, presweetened beverage drink mixes processed by the method described in claim 22.

* * * * *